(12) United States Patent
Du (10) Patent No.: US 11,181,764 B2
(45) Date of Patent: Nov. 23, 2021

(54) DISPLAY PANEL

(71) Applicant: TCL CHINA STAR OPTOELECTRONICS TECHNOLOGY CO., LTD., Shenzhen (CN)

(72) Inventor: Peng Du, Shenzhen (CN)

(*) Notice: Subject to any disclaimer, the term of this patent is extended or adjusted under 35 U.S.C. 154(b) by 242 days.

(21) Appl. No.: 16/620,507

(22) PCT Filed: Nov. 12, 2019

(86) PCT No.: PCT/CN2019/117710
§ 371 (c)(1),
(2) Date: Dec. 8, 2019

(87) PCT Pub. No.: WO2021/072865
PCT Pub. Date: Apr. 22, 2021

(65) Prior Publication Data
US 2021/0333591 A1  Oct. 28, 2021

(30) Foreign Application Priority Data

Oct. 14, 2019  (CN) .......................... 201910974283.2

(51) Int. Cl.
*G02F 1/1333*  (2006.01)
*G06F 3/041*  (2006.01)
(Continued)

(52) U.S. Cl.
CPC ........ *G02F 1/13338* (2013.01); *G02F 1/1368* (2013.01); *G02F 1/13454* (2013.01);
(Continued)

(58) Field of Classification Search
CPC .......... G02F 1/13338; G02F 1/133331; G02F 1/133345; G02F 1/13454; G02F 1/13452;
(Continued)

(56) References Cited

U.S. PATENT DOCUMENTS

2019/0033645 A1  1/2019 Zhang
2019/0204669 A1  7/2019 Lee et al.

FOREIGN PATENT DOCUMENTS

CN  107247355 A  10/2017
CN  107402466 A  11/2017
(Continued)

*Primary Examiner* — Nathanael R Briggs
*Assistant Examiner* — William D Peterson (57) ABSTRACT

A display panel includes a first substrate, a second substrate, and a cover plate which are horizontally stacked on each other and together define a side connection region extending vertically on outer surfaces of lateral end portions of the first substrate, the second substrate, and the cover plate. An electrically conductive connection layer and an electrical functional assembly electrically connected to the same are placed on the side connection region. Insulating layers and conductive layers between them are on the first substrate, a lateral end portion of at least one of the conductive layers is provided with a bonding pad extended to the side connection region and electrically connected to the electrically conductive connection layer, so as to establish electrical connection between the electrical functional assembly and the conductive layers. The display panel can effectively shorten a width of its edge, and realize a "narrow bezel" design.

10 Claims, 7 Drawing Sheets (51) Int. Cl.
*G02F 1/1345* (2006.01)
*G02F 1/1335* (2006.01)
*G02F 1/1368* (2006.01)

(52) U.S. Cl.
CPC .. *G02F 1/133331* (2021.01); *G02F 1/133345* (2013.01); *G02F 1/133357* (2021.01); *G02F 1/133514* (2013.01); *G02F 1/133528* (2013.01); *G06F 3/0412* (2013.01); *G06F 3/04164* (2019.05)

(58) Field of Classification Search
CPC ......... G02F 1/133357; G02F 1/133514; G02F 1/133528; G02F 1/1368; G06F 3/04164; G06F 3/0412
USPC .......................................................... 349/12
See application file for complete search history.

(56) References Cited

FOREIGN PATENT DOCUMENTS

| | | | |
|---|---|---|---|
| CN | 108153070 A | | 6/2018 |
| CN | 110119054 A | * | 8/2019 |
| CN | 110119054 A | | 8/2019 |
| JP | 2017198740 A | | 11/2017 |

\* cited by examiner

DISPLAY PANEL

1. FIELD OF DISCLOSURE

The present invention relates to a field of flat display technology and in particular, to a display panel.

2. DESCRIPTION OF RELATED ART

With development of flat display technology, a full screen trend becomes prevalent, and a narrow-bezel product design has become more and more popular, so how to reduce a bezel width of a display panel is a very important subject in the design.

The common display panels on the market use chip-on-film (COF) or chip-on-glass (COG) manufacturing processes to connect a driver integrated circuit (IC) to a panel body. These two manufacturing processes require an outer lead bonding (OLB) area of the panel body. The OLB area takes up an area of a certain width to connect, and thus it is difficult to reduce a width of a bezel of the display panel.

Figure 1:
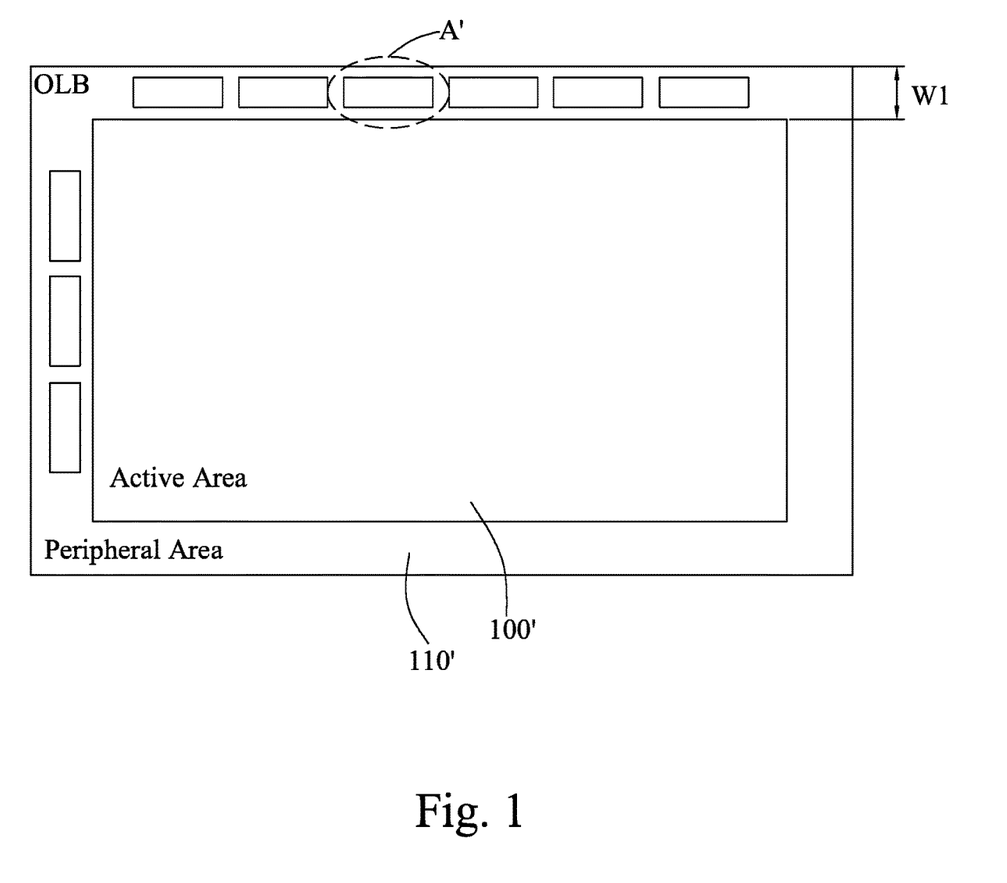
FIG. 1 is a schematic structural view illustrating a conventional display panel.

Please refer to FIG. 1 which illustrates a common display panel including a display area 100' and a peripheral area 110'. The OLB area is in the peripheral area 110', and the peripheral area 110' has a width W1. The OLB area is usually provided with a bonding pad. The bonding pad mainly serves to connect a signal line inside the display panel to the driving integrated circuit (IC) after a module process, and a position of the bonding pad is circle A' in FIG. 1. A length of the bonding pad disposed on the display panel is generally several hundred micro-meters or more, and therefore, it is also difficult to reduce the width W1 of the OLB area where the bonding pad is disposed.

Figure 2:
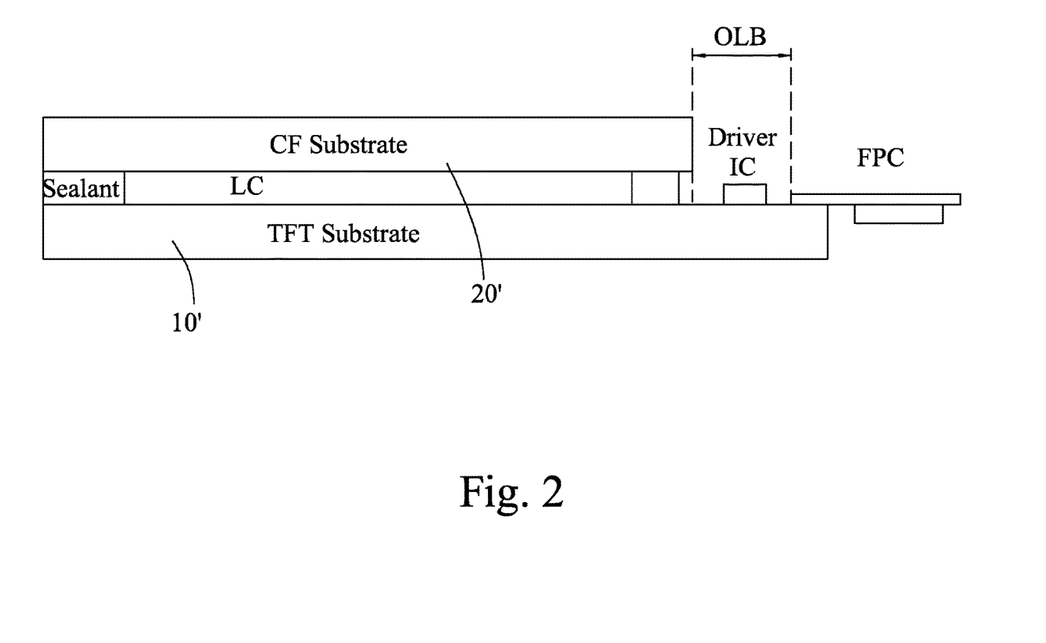
FIG. 2 is a side view illustrating the display panel of FIG. 1.

Further, as shown in FIG. 2 which is a side view of the display panel shown in FIG. 1, a thin-film-transistor (TFT) substrate 10' having the OLB area extends beyond a color filter (CF) substrate 20' by a distance, and a protruding portion of the TFT array substrate is used to attach a chip-on-film (COF) assembly. A width of the OLB area is generally 0.5 mm or more to ensure that the attached COF assembly can perform its functions normally.

Therefore, in such a structure, due to the necessity of the OLB area, it is difficult to further reduce the bezel width of the display panel.

SUMMARY

The present invention provides a display panel that adopts a novel structure that can effectively reduce a width of its edge and thereby realize a "narrow bezel" design.

The present invention provides a technical solution as follows.

The present invention provides a display panel, comprising:
a first substrate;
a second substrate; and
a cover plate, wherein the first substrate, the second substrate, and the cover plate are horizontally stacked on each other and together define a side connection region extending in a vertical direction on outer surfaces of lateral end portions of the first substrate, the second substrate, and the cover plate;
wherein the side connection region is provided with an electrically conductive connection layer and an electrical functional assembly arranged vertically and electrically connected to the electrically conductive connection layer; and
wherein functional layers comprising a plurality of insulating layers are arranged on the first substrate, a plurality of conductive layers are disposed at intervals between the insulating layers, a lateral end portion of at least one of the conductive layers is provided with a bonding pad which is extended to an surface of the side connection region and electrically connected to the electrically conductive connection layer, so as to establish electrical connection between the electrical functional assembly and the conductive layers.

According to one embodiment of the present invention, a width of the side connection region ranges from 1.0 mm to 2.0 mm.

According to one embodiment of the present invention, the electrical functional assembly can be various types for realizing functionality of the display panel, the electrical functional assembly comprises, but is not limited to, a chip-on-film (COF) assembly.

According to one embodiment of the present invention, the electrically conductive connection layer is formed by printing a conductive material on the side connection region. The conductive material comprises, but is not limited to, silver.

According to one embodiment of the present invention, the first substrate comprises a thin-film-transistor (TFT) array substrate, and the second substrate comprises a color filter (CF) substrate.

According to one embodiment of the present invention, the TFT array substrate and the CF substrate are aligned with each other, and a liquid crystal layer is disposed between them. In other words, the display panel is preferably a liquid crystal display (LCD) panel.

According to one embodiment of the present invention, the conductive layers of the functional layers comprise a gate electrode (GE) conductive layer, a source electrode (SE) semiconductor conductive layer, and a third metal layer (M3) disposed spaced apart from each other, and the bonding pad at the lateral end portions of the conductive layers is extended to the side connection region and electrically connected to the electrically conductive connection layer to form a three-point electrical connection structure.

According to one embodiment of the present invention, the insulating layers in the functional layers comprise an interlayer dielectric layer (ILD), a planarization layer (PLN), and a passivation layer (PV) disposed in sequence; the interlayer dielectric layer is disposed between the GE conductive layer and the SE semiconductor conductive layer, the planarization layer is disposed between the SE semiconductor conductive layer and the third metal layer (M3), and the passivation layer is disposed on the third metal layer.

According to one embodiment of the present invention, the functional layers comprise a buffer layer and a gate insulating layer (GI) disposed sequentially, the buffer layer is disposed on the first substrate, and the GE conductive layer is disposed on the gate insulating layer.

According to one embodiment of the present invention, a pixel electrode conductive layer (bottom ITO) is disposed under and connected to the third metal layer, and the bonding pad at the lateral end portion of the pixel electrode conductive layer is extended to the side connection region and electrically connected to the electrically conductive connection layer.

According to one embodiment of the present invention, the third metal layer and the pixel electrode conductive layer (bottom ITO) connected thereunder together constitute a touch sensor, so that the touch sensor is electrically connected to the electrically conductive connection layer.

According to one embodiment of the present invention, a top polarizer is disposed on the CF substrate, and the cover plate is disposed on the top polarizer; wherein a touch sensor is disposed between the CF substrate and the top polarizer, wherein the touch sensor is electrically connected to the electrically conductive connection layer.

According to one embodiment of the present invention, a top polarizer is disposed on the CF substrate, and the cover plate is disposed on the top polarizer; wherein a touch sensor is disposed between the top polarizer and the cover plate, wherein the touch sensor is electrically connected to the electrically conductive connection layer.

Advantages of the present invention: The present invention provides a display panel. The display panel has an electrically conductive connection layer arranged in a vertical orientation on a lateral end of the display panel, and then connects to the electrical functional assembly through side bonding, thus effectively reducing a width of an edge of the display panel, thus achieving a "narrow-bezel" full screen.

Further, the electrically conductive connection layer covers an outer surface at lateral end portions of a first substrate, a second substrate, and a cover plate in the display panel, wherein it is required for the electrically conductive connection layer to protrude to cover an outer surface of the lateral end portion of the cover plate. This way, the present invention can solve a problem in some small-sized display panels. The problem is that the first substrate and the second substrate panel of the small-sized display panels are small in size, so an outer surface region at the lateral end portions of the first and second substrates has an insufficient thickness, and a bonding area is also insufficient, leading to a problem of high contact resistance. The problem is solved by the present invention, because the bonding area where the electrically conductive connection layer can be bonded is composed of the lateral end portions of the first substrate, the second substrate, and the cover plate, and since the cover plate has a certain thickness, the addition of the cover plate causes an increase in the bonding area where the electrically conductive connection layer can be bonded laterally, thereby reducing the contact resistance and improving production yields in subsequent manufacturing processes.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DETAILED DESCRIPTION OF EMBODIMENTS

A display panel according to the present invention will be further described in detail below with reference to the accompanying drawings and embodiments.

Figure 3:
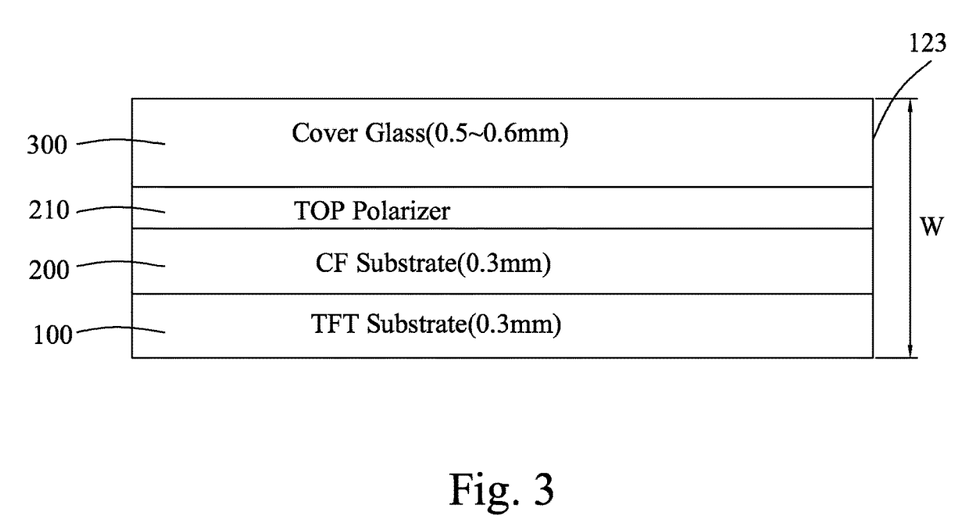
FIG. 3 is a schematic structural view illustrating a display panel according to one embodiment of the present invention.

Referring to FIG. 3, the present invention provides a display panel having a side bonding structure according to a novel concept. The display panel of the present invention has a panel structure different from conventional display panels in that, a first substrate 100, a second substrate 200, and a cover plate 300 are stacked on each other to together define a side connection region 123 at their flush lateral end portions.

The side connection region 123 includes lateral regions of the first substrate 100, the second substrate 200, and the cover plate 300. The display panel is, for example, a liquid crystal display (LCD) panel, wherein the first substrate 100 is a thin-film-transistor (TFT) array substrate, and a lateral thickness of the TFT array substrate is generally 0.3 mm or more; the second substrate 200 is a color filter (CF) substrate, and a lateral thickness of the CF substrate is generally 0.3 mm or more; the cover plate 300 is a cover plate, and a lateral thickness of the cover plate is generally 0.5 mm to 0.6 mm; and therefore, a width W of the side connection region 123 which are defined by the three (the first substrate 100, the second substrate 200, and the cover plate 300) stacked on each other ranges from 1.1 mm to 1.2 mm or above.

Further, regarding the width W, at least a connection region of 0.5 mm is required in order to bond a chip-on-film (COF) assembly described above in "Description of Related Art". In the display panel having such a structure according to the present invention, the side connection region 123 provides a sufficient area for vertically bonding the COF assembly, and since the COF assembly is bonded in a vertical orientation, it does not occupy a horizontal area, and thus, a bezel width of the display panel can be reduced.

Further, the above-mentioned creative concept of the present invention will be further described in the following with reference to example embodiments of the display panels.

Figure 4:
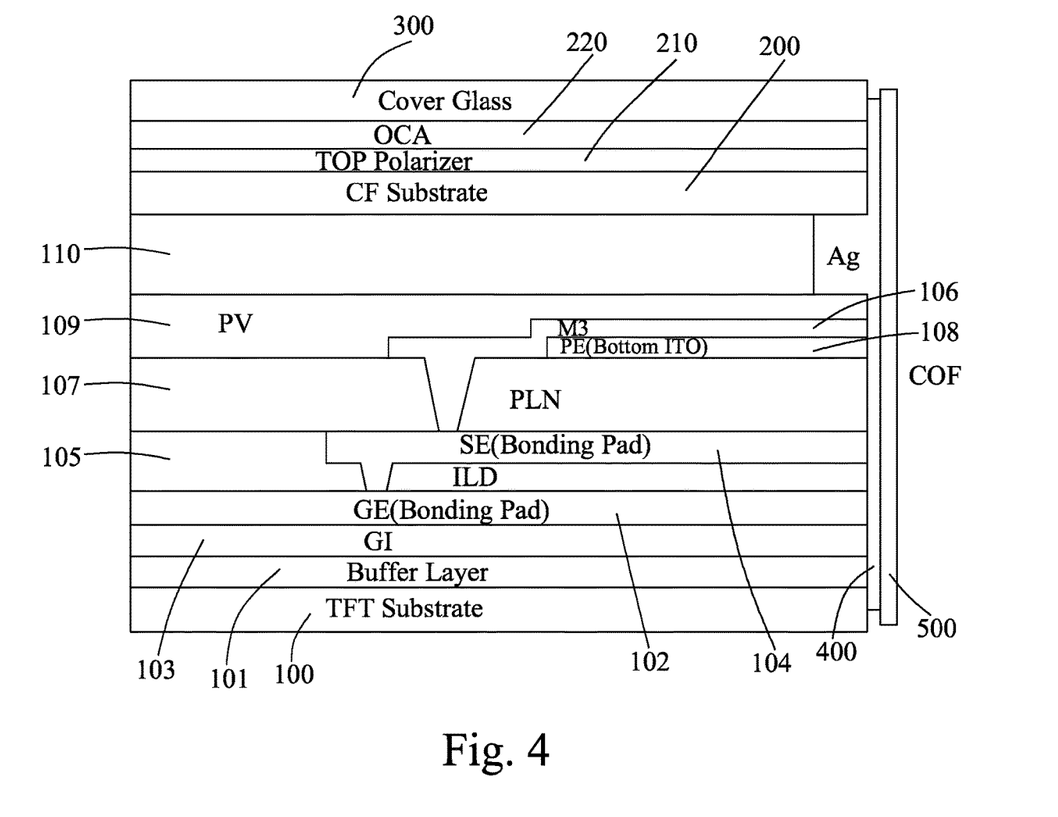
FIG. 4 is a schematic structural view illustrating the display panel according to another embodiment of the present invention.

Referring to FIG. 4, one embodiment of the present invention provides a display panel. The display panel comprises a TFT array substrate 100, a CF substrate 200, and a cover plate 300.

The TFT array substrate 100 and the CF substrate 200 are aligned with each other, and a liquid crystal cell 110 is disposed between them. A plurality of functional layers with an in-cell touch structure are disposed on the TFT array substrate 100.

In detail, the functional layers comprise a buffer layer 101, a gate insulating layer (GI) 103, a gate electrode conductive layer (GE) 102, an interlayer dielectric layer (ILD) 105, and a source electrode conductive layer (SE) 104, a planarization layer (PLN) 107, a third metal layer (M3) 106, a pixel electrode layer (Bottom ITO) 108, and a passivation layer (PV) 109. A top polarizer 210 and an optically clear adhesive (OCA) layer 220 are sequentially disposed between the cover plate 300 and the CF substrate 200.

A stacked structure is composed of the TFT array substrate 100, the functional layers thereon, the liquid crystal cell 110, the CF substrate 200, and the cover plate 300 and defines a side connection region extending in a vertical direction at a lateral end of the stacked structure. An electrically conductive connection layer 400 is disposed on an outer surface of the side connection region. An electrical functional assembly is attached to the electrically conductive connection layer 400. As shown in the drawing, the electrical functional assembly is a chip-on-film (COF) assembly 500; however, the present invention is not limited in this regard.

The electrically conductive connection layer 400 can be formed by printing a constituent material on the side connection regions, but the present invention is not limited in this regard. The constituent material of the electrically conductive connection layer 400 may be made of various conductive materials such as metal, alloy, and a semiconductor conductive material like silver; however, the present invention is not limited in this regard.

Further, as shown in FIG. 4, in the present embodiment, a bonding pad of the conductive layers in the functional layers disposed on the TFT array substrate 100 is formed by three layers (a three-layer structure)—the GE conductive layer 102, the SE conductive layer 104, and the third metal layer (M3) 106/the pixel electrode layer (Bottom ITO) 108. The three layers all extend to the side connection region at a lateral end of the display panel, and the bonding pad is electrically connected to the electrically conductive connection layer 400 disposed on the side connection region, thereby establishing a three-point electrical connection with the COF assembly 500.

Since the electrically conductive connection layer 400 covers lateral surface regions of the TFT array substrate 100, the CF substrate 200, and the cover plate 300 at the same time, an overall thickness of the three-layer structure after stacking is larger, a length of the side connection region that these three layers together define is longer, and as a result, an area of the electrically conductive connection layer 400 which is attached on the side connection region also increases. Therefore, a bonding area between the COF assembly 500 and the electrically conductive connection layer 400 is also increased, thereby reducing a contact resistance between the COF assembly 500 and the electrically conductive connection layer 400, and also improving production yields in subsequent manufacturing processes.

Figure 5:
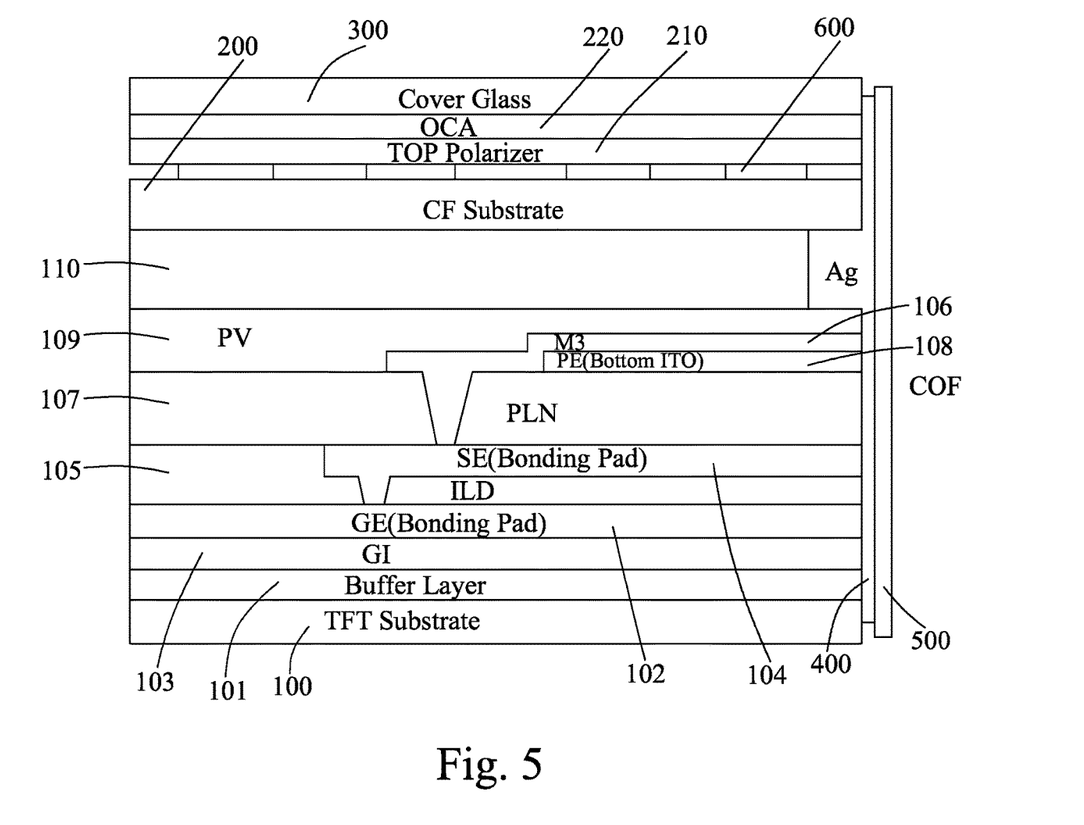
FIG. 5 is a schematic structural view illustrating the display panel according to still another embodiment of the present invention.

Please refer to FIG. 5 which illustrates the display panel according to still another embodiment of the present invention. A structure of the present embodiment is similar to the structure of the display panel shown in FIG. 4. For brevity, only the differences between the two embodiments are described in the following.

As shown in FIG. 5, the display panel employs an on-cell touch structure, wherein a touch sensor 600 is disposed between the CF substrate 200 and the top polarizer 210. It should be noted that the electrically conductive connection layer 400 still covers the side connection region defined by the TFT array substrate 100, the CF substrate 200, and the cover plate 300.

Figure 6:
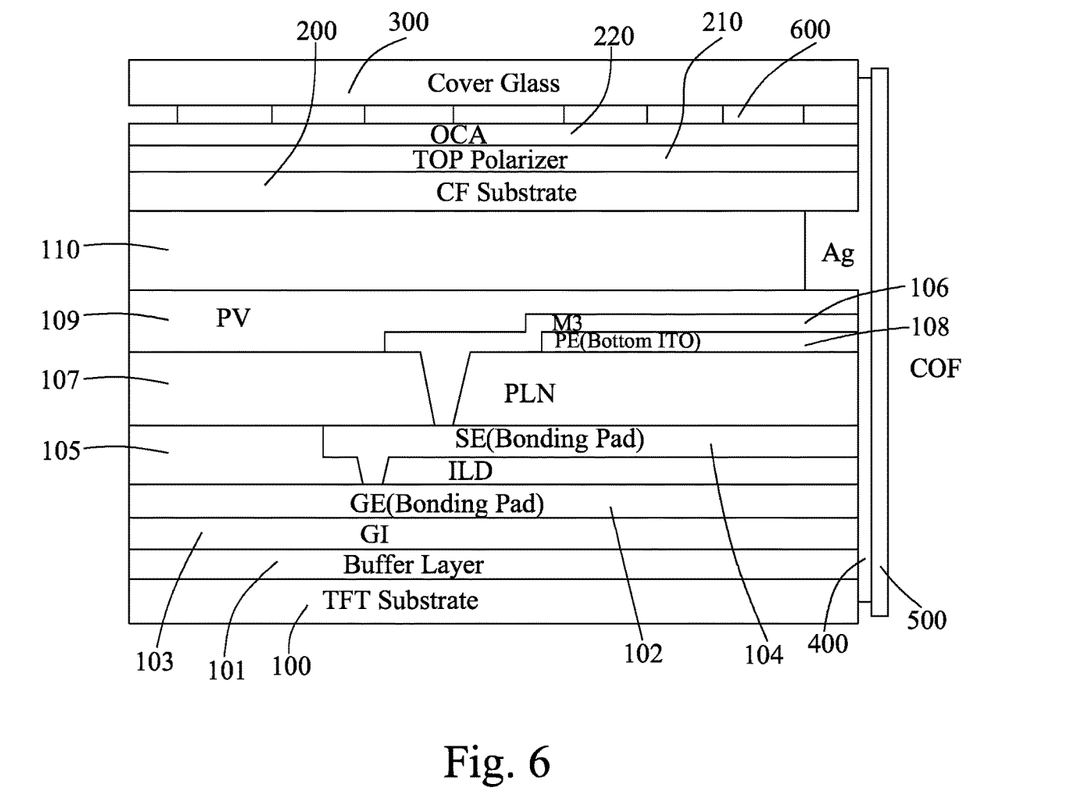
FIG. 6 is a schematic structural view illustrating the display panel according to yet another embodiment of the present invention.

Please refer to FIG. 6 which illustrates the display panel according to yet another embodiment of the present invention. A structure of the present embodiment is similar to the structure of the display panel shown in FIG. 4. For brevity, only the differences between the two embodiments are described in the following.

As shown in FIG. 6, the display panel employs a one-glass-solution (OGS) touch structure, wherein a touch sensor 600 is disposed between the OCA layer 220 and the cover plate 300. It should be noted that the electrically conductive connection layer 400 still covers the side connection region defined by the TFT array substrate 100, the CF substrate 200, and the cover plate 300.

For the display panel according to the three embodiments shown in FIGS. 4, 5 and 6, the bonding pad provided by the conductive layers is connected to a signal line inside the panel. The signal line is, for example, a data line, a scan line, a COM electrode line, and other signal lines (e.g. start vertical signal lines, abbreviated as STV signal lines, and clock signal lines, abbreviated as CK signal lines) required for gate driver on gate driver on array (GOA) circuits. However, in addition to the signals required for displaying images, signals that are required by the touch sensors can also be input by connecting a touch control integrated circuit (touch control IC) through the electrically conductive connection layer 400.

Figure 7:
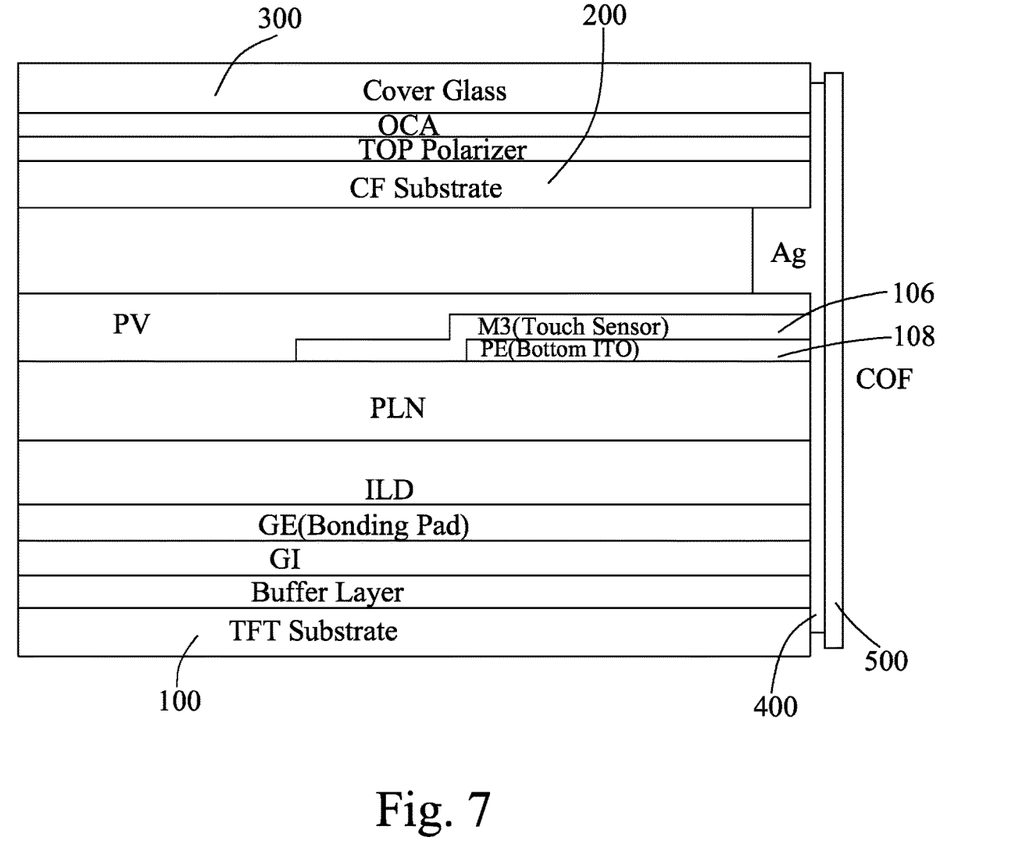
FIG. 7 is a schematic structural view illustrating the display panel according to yet still another embodiment of the present invention.

Please refer to FIG. 7, the display panel uses an in-cell touch sensor structure. The touch sensor is composed of the third metal layer (M3) 106 and the pixel electrode layer (Bottom ITO) 108. The touch sensor is also electrically connected to the COF assembly 500 through the electrically conductive connection layer 400, thereby being connected to the touch control IC.

In addition, since the number of the touch sensors is less, so a pitch of the bonding pad can be larger, and the bonding pad with a greater width can also increase a bonding area. The bonding pad disposed on the TFT array substrate 100 is also a double-layer metal structure (M3+Bottom ITO), which can also increase the bonding area between the two.

The present invention provides the display panel. The display panel has the electrically conductive connection layer arranged in a vertical orientation on a lateral end of the display panel, and then connects to the electrical functional assembly through side bonding, thereby effectively reducing a width of an edge of the display panel, thus achieving a "narrow-bezel" full screen.

Further, the electrically conductive connection layer covers an outer surface at the lateral end portions of the first substrate, the second substrate, and the cover plate in the display panel, wherein it is required for the electrically conductive connection layer to protrude to cover an outer surface of the lateral end portion of the cover plate. This way, the present invention can solve a problem in some small-sized display panels. The problem is that the first substrate and the second substrate panel are small in size, so an outer surface region of the lateral end portions of the first and second substrates has an insufficient thickness, and a bonding area is also insufficient, leading to a problem of high contact resistance. The problem is solved by the present invention, because the bonding area where the electrically conductive connection layer can be bonded is composed of the lateral end portions of the first substrate, the second substrate, and the cover plate, and since the cover plate has a certain thickness, the addition of the cover plate causes an increase in the bonding area where the electrically conductive connection layer can be bonded laterally, thereby reducing the contact resistance and improving production yields in subsequent manufacturing processes.

The protection scope of the present invention is not limited to the above description, and those skilled in the art can make various modifications and changes to the above embodiments without departing from the concept and ideas of the present invention. All such modifications and changes are deemed to be within the protection scope of the present invention.

What is claimed is:

1. A display panel, comprising:
   a first substrate;
   a second substrate; and
   a cover plate, wherein the first substrate, the second substrate, and the cover plate are horizontally stacked on each other and together define a side connection region extending in a vertical direction on outer surfaces of lateral end portions of the first substrate, the second substrate, and the cover plate;
   wherein the side connection region is provided with an electrically conductive connection layer and an electrical functional assembly arranged vertically and electrically connected to the electrically conductive connection layer; and
   wherein functional layers comprising a plurality of insulating layers are arranged on the first substrate, a plurality of conductive layers are disposed at intervals between the insulating layers, a lateral end portion of at least one of the conductive layers is provided with a bonding pad which is extended to a surface of the side connection region and electrically connected to the electrically conductive connection layer, so as to establish electrical connection between the electrical functional assembly and the conductive layers.

2. The display panel according to claim 1, wherein a width of the side connection region ranges from 1.0 mm to 2.0 mm.

3. The display panel according to claim 1, wherein the electrical functional assembly comprises a chip-on-film assembly.

4. The display panel according to claim 1, wherein the electrically conductive connection layer is formed by printing a conductive material on the side connection region.

5. The display panel according to claim 1, wherein the first substrate comprises a thin-film-transistor (TFT) array substrate, and the second substrate comprises a color filter (CF) substrate.

6. The display panel according to claim 1, wherein the conductive layers of the functional layers comprise a gate electrode (GE) conductive layer, a source electrode (SE) semiconductor conductive layer, and a third metal layer disposed spaced apart from each other, and the bonding pad at the lateral end portions of the conductive layers is extended to the side connection region and electrically connected to the electrically conductive connection layer to form a three-point electrical connection structure.

7. The display panel according to claim 6, wherein the insulating layers in the functional layers comprise an interlayer dielectric layer, a planarization layer, and a passivation layer disposed in sequence; the interlayer dielectric layer is disposed between the GE conductive layer and the SE semiconductor conductive layer, the planarization layer is disposed between the SE semiconductor conductive layer and the third metal layer, and the passivation layer is disposed on the third metal layer.

8. The display panel according to claim 7, wherein the functional layers comprise a buffer layer and a gate insulating layer disposed sequentially, the buffer layer is disposed on the first substrate, and the GE conductive layer is disposed on the gate insulating layer.

9. The display panel according to claim 6, wherein a pixel electrode conductive layer is disposed under and connected to the third metal layer, and the bonding pad at the lateral end portion of the pixel electrode conductive layer is extended to the side connection region and electrically connected to the electrically conductive connection layer.

10. The display panel according to claim 1, wherein a top polarizer is disposed on the CF substrate, and the cover plate is disposed on the top polarizer;
   wherein a touch sensor is disposed between the CF substrate and the top polarizer or between the top polarizer and the cover plate, wherein the touch sensor is electrically connected to the electrically conductive connection layer.

* * * * *